Jan. 31, 1956 T. B. ROWLAND 2,733,048
MILK COOLER
Filed Feb. 10, 1953 2 Sheets-Sheet 2
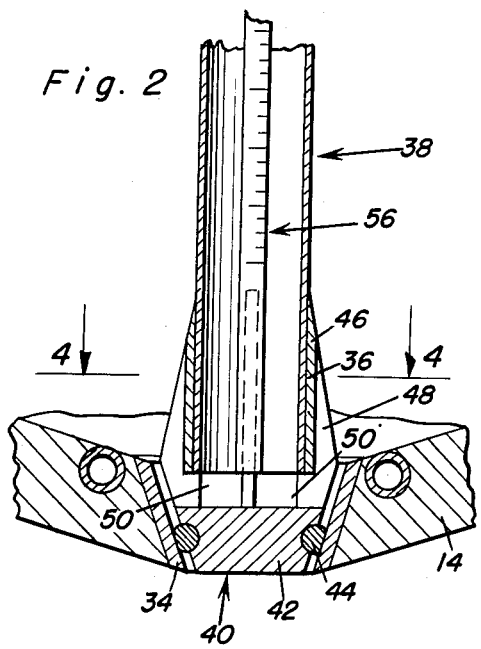
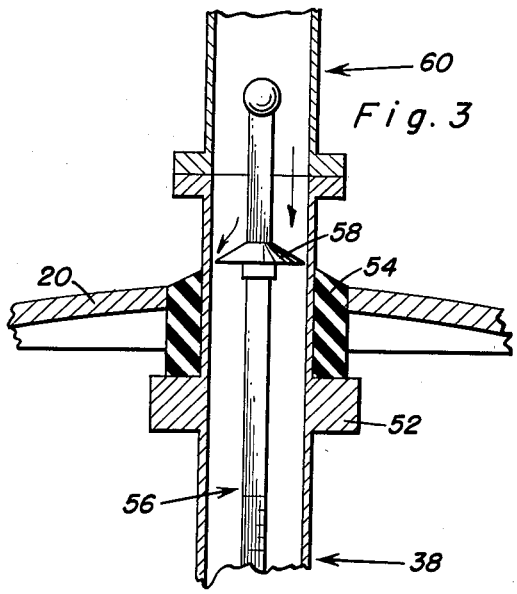
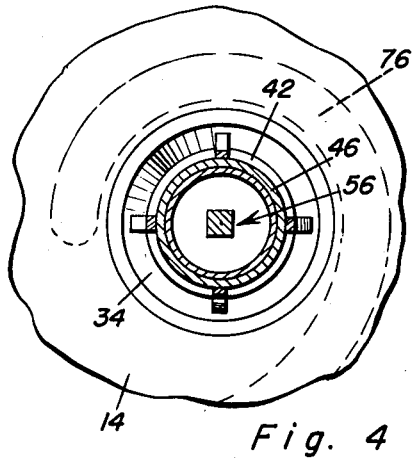
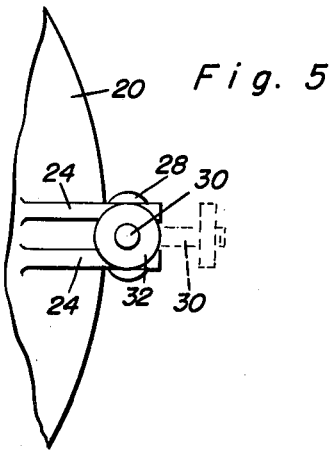
Thomas B. Rowland
INVENTOR.

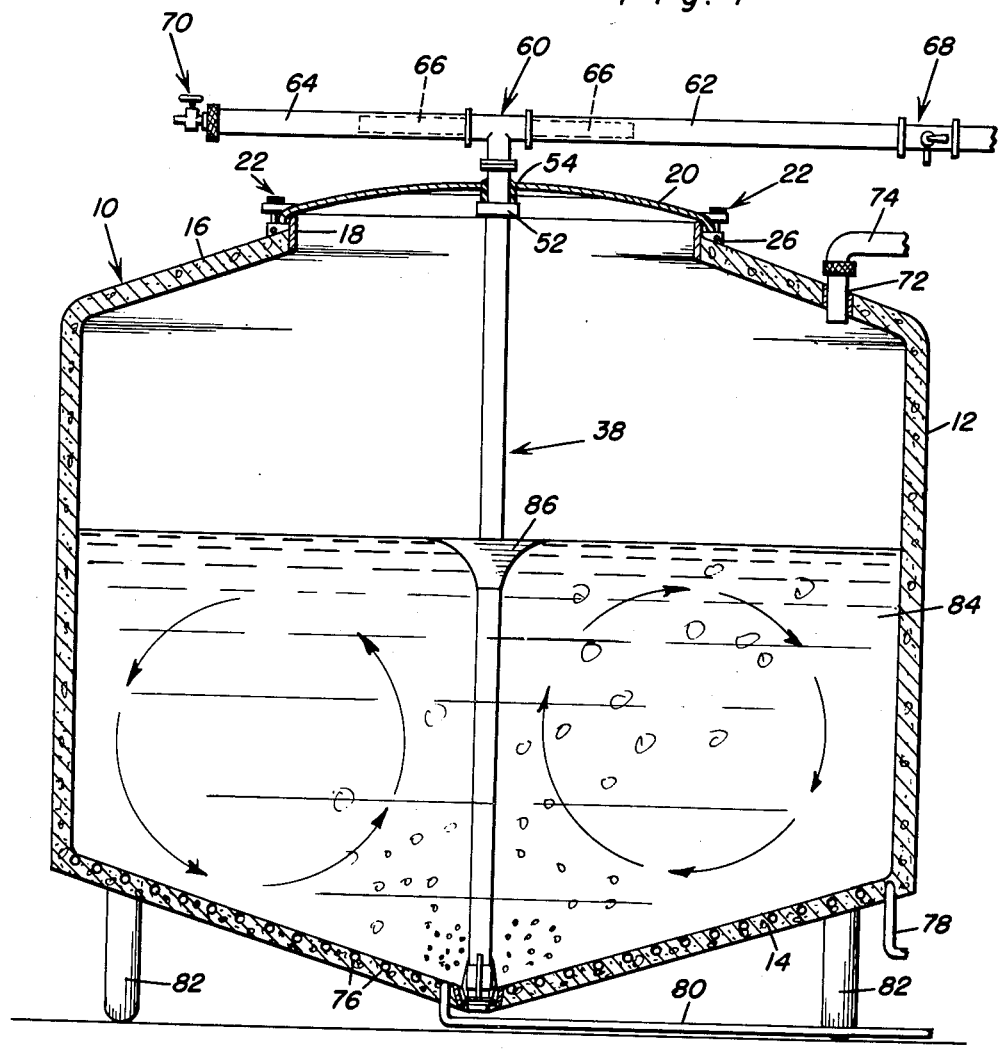

United States Patent Office

2,733,048
Patented Jan. 31, 1956

2,733,048
MILK COOLER
Thomas B. Rowland, Pocatello, Idaho

Application February 10, 1953, Serial No. 336,033

3 Claims. (Cl. 257—76)

This invention relates to dairy apparatus, and more particularly to a milk cooler utilized for the reception and storage of milk.

An object of this invention is to provide a milk cooler having a combined inlet and outlet pipe extending therefrom which is adapted to perform its function in response to pressure conditions existing within the tank.

Another object of this invention is to provide a milk cooler which is adapted to be connected to a suitable source of vacuum whereby milk will be inducted thereinto without necessitating the passage of the same through mechanical devices.

Another object of this invention is to provide a milk cooler which is adapted to be connected to a suitable source of pressure whereby milk may be discharged therefrom without necessitating the passage of the same through mechanical devices.

Another object of this invention is to provide a milk cooler of improved and novel construction wherein the cooler, in response to a vacuum condition existing therein, will effect an agitating and circulatory action upon milk disposed in the cooler.

Another object of this invention is to provide a milk cooler which is economical in design and yet which is fully effective to produce the desired results.

Another object of this invention is to provide a milk cooler with a removable cover and a standpipe or conduit cooperating therewith in maintaining the standpipe in proper position within the cooler, the lower end of the standpipe being communicated with the interior of the cooler.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical section taken through the milk cooler and showing its internal construction, and also showing its manner of operation;

Figure 2 is an enlarged vertical section of the lower end of the standpipe and an adjacent portion of the cooler bottom;

Figure 3 is an enlarged vertical section of the upper end of the standpipe and a portion of the cooler cover and showing the graduated scale and deflector mounted therein, the arrows indicating the direction of flow of incoming milk;

Figure 4 is a horizontal section taken substantially along the plane of section line 4—4 of Figure 2 and showing details of construction of the end valve assembly; and Figure 5 is a plan view of a portion of the cooler cover showing its manner of attachment to the cooler, the clamping pins being shown disengaged in dotted lines.

Referring now more particularly to Figure 1, reference numeral 10 indicates generally the milk cooling tank which is provided with a cylindrical side wall 12, a conical bottom wall 14 and a conical top wall 16 which is apertured centrally thereof to provide access to the interior of the tank. A resilient annular seal 18 is secured to the surface of the top wall defining the aperture and a cover 20 is sealingly engaged thereagainst under action of the clamp member 22. With further reference to Figure 5, it will be seen that the cover is provided with a pair of spaced lugs 24 and the top wall is provided with a corresponding pair of ears 26 through which the pivot pin 28 of the clamping members is engaged. The clamping members are of substantially T-shape and the uprights 30 are threaded at their upper ends to receive a clamping nut 32 and, as will be obvious from Figure 5, the clamping members may be swung into and out of position between the spaced lugs 24 in cooperation with tightening or loosening of the clamping nut to removably position the cover on the tank.

Referring now more particularly to Figure 2, the bottom wall 14 is provided with an aperture within which a tapered metallic insert 34 is inserted, the same presenting a valve seat. The lower end 36 of standpipe or conduit 38 is provided with a valve member 40 which has a tapered lower end 42 disposed within the confines of the insert 34 and provided with a peripheral groove for the reception of an O-ring 44 which sealingly engages against the insert. The valve member is provided with a hub portion 46 which is suitably secured to the lower end of the standpipe and which is provided with radially extending spacing fingers 48 which carry the plug portion at their lower end. In this manner, the valve assembly provides openings 50 through which the lower end of the standpipe communicates with the interior of the milk cooler.

The upper end of the standpipe extends through a central aperture in the cover 20 and is provided with a collar 52 disposed within the tank below the cover and a resilient seal 54 carried by the cover sealingly engages against the upper surface of this collar and urges the standpipe downwardly towards the bottom 14 to effect sealing engagement of the O-ring against the insert.

Referring now more particularly to Figures 2 and 3, it will be seen that a graduated level indicator 56 is disposed concentrically within the standpipe and is provided adjacent its upper end with a conical deflecting member 58 which will deflect milk impinging thereon upon the inner surface of the standpipe, as indicated by the arrows in Figure 3, for a purpose presently apparent.

For the purpose of brevity and clarity, the upper end of the standpipe is diagrammatically shown as coupled to a T-element 60 whose horizontal branches are connected respectively to a milk pipe line 62 and an air bleed line 64. It is to be understood that the coupling between the T and the upper end of the standpipe may be accomplished in any conventional manner, the exact construction of which forms no part of this invention, and is therefore not shown and described in detail. Both the milk pipe line and the air bleed line may be provided with filter elements 66 therein for the purpose of preventing impurities from entering the cooling tank, and these elements are likewise conventional in nature and are therefore not described and shown in detail.

For purposes presently apparent, the milk pipe line is provided with a shut-off valve 68 and the air bleed line is provided with a shut-off valve 70 and also for a purpose presently apparent, the top wall 16 of the cooler tank is provided with a pipe 72 communicating with the interior thereof to which is coupled an air line 74.

For the purpose of cooling the milk disposed within the tank, a plurality of cooling coils 76 are provided in the bottom wall thereof which are connected to a suitable source of refrigerant by the inlet and outlet lines 78 and 80, and supporting legs 82 may be provided on the bottom wall of the tank for supporting the same in spaced relation to the floor.

In operation, the upper end of the standpipe is connected through the T-coupling to the milk pipe line and to the air bleed line, and the pipe connection 72 is connected to a suitable source of vacuum pressure, which vacuum producing mechanism is not shown. The air bleed valve 70 is shut off and the milk valve 68 is opened to allow milk to be inducted into the tank through the lower end of the standpipe in response to the vacuum existing within the interior of the cooler tank and, as indicated by the reference numeral 84 in Figure 1, a supply of milk will therefore be disposed within the cooler tank. To effect a most efficient cooling of the milk disposed within the tank, the air bleed line may be opened to allow air to be bled therethrough and into the tank through the lower end of the standpipe whence it will bubble upwardly through the milk and agitate the same to produce a circulatory motion of the milk within the tank, as clearly shown by the arrows in Figure 1. Thus, the milk within the tank is constantly agitated and brought into contact with the refrigerated portion of the tank to effect a rapid and even cooling of its contents.

In this manner, milk may be disposed and stored within the cooler tank from several successive milkings and when it is desired to transport the milk to market, as by a tank truck, the milk pipe line may be connected to a suitable discharge line by valve mechanisms, not shown, for discharging milk disposed within the cooler tank into the truck or other receptacle providing for its transportation. When it is thus desired to discharge milk from the cooler, it is merely necessary to connect the pipe 72 to a suitable source of positive pressure which will force the milk 84 outwardly through the bottom or lower end of the standpipe into the milk pipe line and outwardly therefrom through the discharge conduit or pipe.

It will be understood that the bottom wall 14, although not necessarily formed of conical shape, is preferably formed in an inwardly sloping manner so as to most naturally conform to the flow path of the circulatory agitation imparted by the action of the air bubbles drawn into the cooler tank through the lower end of the standpipe under the action of the vacuum pressure within the tank. In order to further aid in inducing the most natural circulatory flow within the tank, a substantially conical float 86 is slidably received on the standpipe and, as will be readily apparent, this float will remain at the top of the milk surface and tend to provide a natural flow path for the circulatory motion of the milk within the cooler.

Also, it will be understood that all metallic parts used in the construction of the milk cooler will be formed from stainless steel, to conform to the laws governing dairy products.

It will be readily appreciated that the cover may be removed allowing the standpipe to be disengaged from its sealing contact with the valve seat, whereupon the tank is readily cleaned and/or inspected.

From the foregoing, the construction and operation of the device will be readily understood and further explanation is believed to be unnecessary. However, since numerous modifications and changes will readily occur to those skilled in the art, it is not intended to limit the invention to the exact construction shown and described, and accordingly, all suitable modifications and equivalents may be resorted to which fall within the scope of the appended claims.

What is claimed as new is as follows:

1. A dairy apparatus comprising a sealed tank having a dished bottom wall, means for refrigerating at the least the bottom wall of said tank, a vertical conduit disposed within the tank the lower end of the conduit being positioned closely adjacent the center of said bottom wall and communicating thereat with the interior of the tank, an inverted substantially conical float member slidably received on said conduit, means for connecting said tank to a source of vacuum and means for selectively bleeding air into said tank through said conduit, whereby air bubbles rising from the lower end of the conduit will impinge upon and be deflected by the surface of the float to impart a circular agitating motion to milk within the tank.

2. A dairy apparatus comprising a sealed tank, a vertical conduit disposed within said tank having its upper end extending therefrom, an inverted substantially conical float member slidably secured on said conduit first and second pipe lines connected to said conduit, said conduit having its lower end open and disposed adjacent the bottom of said tank, means for refrigerating said tank, a pipe connection communicating with the interior of said tank adapted to be selectively connected to a source of vacuum for inducting milk through said first pipe line and the conduit into said tank and to a source of pressure for educting milk from the tank through said conduit and said second pipe line, means in said second pipe line for bleeding air into said tank through the open lower end of said conduit when the pipe connection is connected to a source of vacuum whereby the air entering and rising within the tank from the lower end of said conduit will impinge upon and be deflected by the surface of the float to effect an agitating circulatory action on milk disposed within the milk.

3. In a milk storage tank having an open top and a tapered aperture in its bottom wall, a removable cover clamped to the top of said tank, a vertical conduit disposed within the tank having its upper end extending through said cover, said conduit having its lower end disposed adjacent the tapered aperture in the bottom of said tank, means on said conduit for sealing said aperture and communicating said conduit with the interior of said tank, means on the upper end of said conduit for urging said first stated means into sealing engagement with the aperture, said second means comprising a collar on said conduit within the tank and adjacent said cover, and a resilient gasket disposed between said cover and said collar.

References Cited in the file of this patent

UNITED STATES PATENTS

| | | |
|---|---|---|
| 906,532 | Jensen | Dec. 15, 1908 |
| 1,933,191 | Stover | Oct. 31, 1933 |
| 2,048,266 | Jenkins | July 21, 1936 |
| 2,050,771 | Wait | Aug. 11, 1936 |
| 2,241,337 | Work | May 6, 1941 |
| 2,557,252 | Bannister et al. | June 19, 1951 |
| 2,670,008 | Kopp | Feb. 23, 1954 |